US012718833B2

United States Patent
(12) United States Patent
Chourdakis

(10) Patent No.: US 12,718,833 B2
(45) Date of Patent: Aug. 25, 2026

(54) METHOD FOR PROCESSING AN AUDIO SIGNAL

(71) Applicant: Nomono AS, Trondheim (NO)

(72) Inventor: Emmanouil Chourdakis, Trondheim (NO)

(73) Assignee: Nomono AS, Trondheim (NO)

( * ) Notice: Subject to any disclaimer, the term of this patent is extended or adjusted under 35 U.S.C. 154(b) by 168 days.

(21) Appl. No.: 18/846,148

(22) PCT Filed: Mar. 10, 2023

(86) PCT No.: PCT/EP2023/056200
§ 371 (c)(1),
(2) Date: Sep. 11, 2024

(87) PCT Pub. No.: WO2023/170283
PCT Pub. Date: Sep. 14, 2023

(65) Prior Publication Data
US 2025/0191602 A1 Jun. 12, 2025

(30) Foreign Application Priority Data
Mar. 11, 2022 (DK) ............................ PA202270098

(51) Int. Cl.
*G10L 21/0232* (2013.01)
*G10L 21/02* (2013.01)
(Continued)

(52) U.S. Cl.
CPC .......... *G10L 21/0232* (2013.01); *G10L 21/02* (2013.01); *G10L 21/0208* (2013.01);
(Continued)

(58) Field of Classification Search
CPC ............ G10L 21/0232; G10L 21/0208; G10L 21/0216; G10L 21/02; H04R 3/04; H04S 2400/15
See application file for complete search history.

(56) References Cited

U.S. PATENT DOCUMENTS 6,721,428 B1 4/2004 Allred et al.
2005/0119879 A1* 6/2005 Sung ...................... G10L 21/02
704/E21.002
(Continued)

FOREIGN PATENT DOCUMENTS

EP 2978242 A1 1/2016
EP 3113183 A1 1/2017

OTHER PUBLICATIONS

Xiuli et al., "Design of Digital Parametric Equalizer Based on Second-Order Function", Electronic and Information Engineering Department, 2010, 4 pages.
(Continued)

*Primary Examiner* — Samuel G Neway
(74) *Attorney, Agent, or Firm* — SHOOK, HARDY & BACON L.L.P.

(57) ABSTRACT

The present invention concerns a computer implemented method for processing an audio signal for which an audio signal containing speech is obtained. Then a smoothed difference signal is derived from the obtained audio signal and smoothed spectrum thereof. At least one peak is detected in the obtained difference signal and a peaking filter generated based on the at least one detected peak. The peaking filter comprises at least a Q factor and a gain parameter, whereas the Q factor is based on the geometrically obtained cut-off frequencies around the at least one detected peak; and the gain parameter is derived from a gain interaction matrix
(Continued)

with elements based on magnitude responses at cut-off frequencies around the at least one detected peak.

15 Claims, 8 Drawing Sheets

(51) Int. Cl.

| | |
|---|---|
| ***G10L 21/0208*** | (2013.01) |
| ***G10L 21/0216*** | (2013.01) |
| ***G10L 21/10*** | (2013.01) |
| ***H04R 3/04*** | (2006.01) |

(52) U.S. Cl.

CPC .......... *G10L 21/0216* (2013.01); *G10L 21/10* (2013.01); *H04R 3/04* (2013.01); *H04S 2400/15* (2013.01)

(56) References Cited

U.S. PATENT DOCUMENTS

| | | | | |
|---|---|---|---|---|
| 2009/0299742 | A1* | 12/2009 | Toman | G10L 21/0208 704/E15.039 |
| 2016/0029124 | A1 | 1/2016 | Paranjpe | |
| 2016/0365099 | A1* | 12/2016 | Pandey | G10L 21/0264 |
| 2017/0047080 | A1 | 2/2017 | Shiga | |
| 2019/0206420 | A1* | 7/2019 | Kandade Rajan | G10L 21/0264 |
| 2022/0045659 | A1 | 2/2022 | Lesso et al. | |
| 2025/0191602 | A1* | 6/2025 | Chourdakis | G10L 21/0232 |

OTHER PUBLICATIONS

International Search Report, May 8, 2023, 3 pages.

* cited by examiner

METHOD FOR PROCESSING AN AUDIO SIGNAL

CROSS-REFERENCE TO RELATED APPLICATIONS

This application claims priority under 35 U.S.C. § 365 to PCT/EP2023/056200 filed on Mar. 10, 2022, entitled "METHOD FOR PROCESSING AN AUDIO SIGNAL," and Denmark Patent Application No. PA202270098, filed Mar. 11, 2022, entitled "METHOD FOR PROCESSING AN AUDIO SIGNAL." The entirety of the aforementioned applications are incorporated herein by reference.

The present invention concerns a computer-implemented method for processing an audio signal, a computer system for performing the method and a non-transitory computer-readable storage medium.

BACKGROUND

The generation of high-quality audio is key for conveying a story, both for pure audio content as well as video content to a broader audience, most important for today's content providers. However, conventional audio recording methods often face a drawback due to the mediocre or bad audio quality. The reduction of quality in the recorded sound can have many causes, one of them being artificial sounds at certain audible frequencies. Those noises are generated for examples from ground loop noise (the typical 50 Hz or 60 Hz humming), light hums as well as room modes.

While such artificial noise can significantly hamper the listener's experience, another drawback lies in the fact that post processing of audio requires substantial efforts. Particularly, improving audio quality often requires several iterations, in which the content provider listens to the processed audio signal until the desired result is achieved.

The above-mentioned issues are addressed by a denoising process, which aims among other aspects to specifically suppress the frequencies at which the above artificial noise occurs. This process can be part of or also added to already existing denoising processes, for which the noise of the recorded audio signal is identified and subsequently removed. This process often requires manual work and the setting of several parameters until the desired quality and best eligibility is obtained.

Some solutions proposed pre-defined profiles, to which the noisy recorded sound signal is matched against. While such approach may result in an improved sound, it is rather inflexible as it requires many pre-specified profiles to be able to process sound signals recorded under different environments. Generally, this approach also changes the characteristics of the recorded sound signal; a feat that is usually undesirable. Another solution lies in iterative approaches or the use of deep learning networks to build a model able to suppress the artificial noise. However, such approaches are computationally quite expensive.

Consequently, there is a desire to simplify or at least reduce the complexity of the denoising process and provide a flexible denoising process that requires less computational efforts.

SUMMARY OF THE INVENTION

This and other objects are addressed by the subject matter of the independent claims. Features and further aspects of the proposed principles are outlined in the dependent claims.

The inventor proposes the use of a simpler geometrically aided model to obtain a plurality of filter elements that can be used to suppress previously identified artificial noise peaks. The proposal is based on the findings that an equalizing peaking filter cascade, referred to as peaking EQ with a negative gain can be used to surgically suppress frequencies that are annoying to the listeners. The cascade is built in such way, that the output of one filter element acts as an input for a subsequent element, such that the overall transfer function of the cascade is the product of the transfer functions of each individual filter element.

In contrast to conventional models, which require typical profiles to identify the frequencies of interest, the proposed method is also adaptive, meaning that the center frequencies for the respective filter elements are adjusted to the actual sound signal and therefore highly flexible. In other words, actual noise peaks are identified within the recorded sound signal without the need for or the existence of a pre-recorded profile.

In an aspect, a computer implemented method for processing an audio signal is proposed, in which an audio signal, in particular containing speech is obtained. The audio signal is pre-processed to generate a smoothed difference signal therefrom as well as a smoothed spectrum thereof. In accordance with the proposed principle, at least one peak, particularly originating from a noise source is detected in the generated smoothed difference signal or the smoothed spectrum thereof.

This aspect refers to the adaptive portion of the proposed process, as the detection and identification of the peak originating from a noise source is adjustable and not based on a pre-specified profile. In some instances, one may ignore certain detected peaks below a first frequency threshold or above a certain second frequency threshold. While the first frequency threshold is useful to avoid attenuating portions of speech (as speech fundamentals are often below 1 kHz with harmonics usually much above 1 kHz), the second frequency threshold can be used to reduce the computational efforts. The latter may often lie above 15 kHz and in frequency ranges barely audible and not affecting the listener's experience. Typical values for a first frequency threshold value are 150 Hz or 200 Hz and generally below 300 Hz. On the other hand peaks at frequencies above 20 kHz can also often be ignored, particularly if the magnitude of such peaks is not very high.

In a further step, a peaking filter is generated based on the at least one detected peak after detecting the at least one peak. The filter is subsequently used to surgically suppress the peak in the obtained sound signal. For this purpose, one needs to define the bandwidth of the respective filter as well as its negative gain. The bandwidth is also expressed as a Q factor. For the purpose of the present application Q factor is used, although the proposed method can be implemented by setting a certain bandwidth as well. To this regard, Q factor and bandwidth shall be understood as similar and included in the sense of the claims until expressed differently.

It has been found that the Q factor necessary to provide a good suppression is not a constant value for the various possible scenarios, but actually varies depending on the characteristics of each peak. Consequently, a suitable Q factor for peak suppression has to be determined for each of the detected peaks. Hence, the Q factor is geometrically obtained based on determined cut-off frequencies around the at least one detected peak.

However, adjacent negative peaking filters may affect each other in case of suppressing more than one peak. In order to reduce such undesired interaction, the gain for the respective filter elements is derived from a gain interaction matrix with elements based on magnitude responses at cut-off frequencies around the at least one detected peak. In other words, the gain interaction matrix takes the position, Q factor or bandwidth of the respective filter elements into account to achieve a compromise between suppressing the peak and affecting the adjacent filters.

In some instances, the bandwidth of the respective filter elements in a series of filter elements of the peaking filter is adjusted after the Q factor for the respective elements is determined. This ensures that the filter elements do not overlap and the interaction between them is kept at minimum. This limitation may start for filter elements suppressing peaks at low frequency and then continue to higher frequencies. In some instances, the overall bandwidth of filter elements in a peaking filter with several elements may not exceed ⅓ octave.

With the proposed method, it is possible to detect noise peaks and individually suppress them in a flexible and efficient manner. The detection of such peaks allows a flexible adjustment and offer the application of this method for sound and speech recorded at different environments. The present method is largely independent of other sound processing tasks, but can easily implemented in existing workflows. It requires not much computational effort and can therefore be used on recording devices with low computational capabilities for pre-processing.

As stated before, the proposed method can be applied to a single peak, but also to a plurality of peaks. In the latter instance, the plurality of peaks is detected, and the peaking filter is generated based on the detected peaks of the plurality of peaks individually. The peaking filter comprises a cascade of filter elements and each filter element is associated with one of the plurality of the detected peaks. Such approach is suitable, as the gain and Q factor of a respective filter elements affect adjacent filter elements, which will be the case, if the peaks are close together. Alternatively, an individual peak can be detected and a peaking filter with a single element applied to the detected peak. then a second peak is detected, and a new peaking filter applied to the second peak. This process is repeated through all peaks and is particularly useful if the various peaks are spaced apart and do not affect each other due to its low computational effort.

The peaking filter may comprise a plurality of filter elements, each filter element defined by a Q factor and a gain parameter. The gain parameter of each filter element is derived from a gain interaction matrix based on magnitude responses at cut-off frequencies at each of the plurality of detected peaks. The Q factor is based on the geometrically obtained cut-off frequencies around the associated one of the plurality of detected peaks. In other words, the Q factor and the gain parameter define the respective filter element on the peaking filter.

Some aspects concern the step of obtaining smoothed difference signal. For instance, the audio signal is processed to generate a smoothed spectrum of the obtained audio signal. Then, a difference between the obtained audio signal and the smoothed spectrum is determined and calculated to obtain the smoothed difference signal. The smoothing factor of the smoothed spectrum may be adjustable in some instances. In addition and optionally, the difference signal is further smoothed as well with a smoothing factor different from a smoothing factor used for providing a smoothed spectrum. The latter optional step is not necessary, but it will further soften the spectral differences and subsequently simplify the calculation of the Q factor.

One aspect concerns the generation of the smoothed spectrum. It has been generally observed that a "good spectrum" is a smooth spectrum. That is that if any portion "stands out" in the frequency spectrum, like a sharp peak or a hill, then it may very likely be a spurious signal a noise or some other undesired component. Depending on the characteristics of such "mistakes" in the smoothed spectrum, the peaking filter can be applied. Consequently, one may first windowing the obtained audio signal having a certain window length. The window length is in the range between 5 s and 30 s and in particular between 10 s and 25 s and in particular between 15 s and 20 s and in particular shorter than 22 s.

Subsequently, a Short Time Fourier transform of the windowed signal over time is computed and averaged. Alternatively, a periodogram of the windowed signal can be computed, using for example Welch's method, and taking the square root therefrom. The so obtained computed spectrum can be optionally converted to dB scale and also further smoothed.

In some instances, the at least one peak may be detected by applying a threshold to the obtained difference signal. The peak or peaks are identified as they exceed the threshold. In another approach, the step of detecting at least one peak comprises applying a threshold to the obtained difference signal and identifying a largest first peak exceeding the threshold. The position of this peak may be stored for later processing. Then, a largest second peak towards lower frequencies is identified, wherein said peak is at least a minimum distance in frequency from the largest first peak, said largest first peak forming a center.

The latter step above can be repeated with the largest second peak forming a new center until all peaks above the threshold towards the lower frequencies have been identified. Likewise, a largest third peak towards higher frequencies is identified, wherein the third peak is at least a minimum distance in frequency from the largest first peak forming a center. As for the lower frequencies, the step can be repeated with the largest third peak forming the center. All of the identified peaks may be stored in memory. The peaking filter is then applied to the respective sound signal, whereas each filter element with its gain parameter and Q factor calculated is associated with one of the peaks.

In yet another aspect, the step of applying a peaking filter on the at least one detected peak comprises after detecting the at least one peak the calculation of the gain parameter for the filter element associated with the at least one peak. For this purpose, one may use the gain interaction matrix based on magnitude responses at cut-off frequencies around the at least one peak. The gain interaction matrix takes possible interaction of the gains of different adjacent filter elements into account. Afterwards, the Q factor may be calculated based on the determined cut-off frequencies around the at least one detected peak and the gain thereof.

Some aspects concern the calculation of the Q factor. For example, the Q factor may be based on a bandwidth given by the logarithmic value of a difference by the respective cut-off frequencies around the at least one detected peak. In some instances, the Q factor can be derived by identifying the two inflection points of the smoothed difference signal around the at least one detected peak (on the left and right side). Then, a virtual tangent through the inflection point corresponding to the steepest slope is computed. The expression "computing a virtual tangent" does include approximating a function that closely resembles the function of the tangent. The crossing point between the virtual tangent and an average gain value is subsequently determined. The average gain value in such case is derived from gain values of the target peak and considered to be half of said value. Based on the determined crossing point the bandwidth can be computed (i.e. by mirroring the crossing point on an axis through the peak on the frequency axis. Based on the bandwidth, the Q factor is determined, which also depends on the crossing point.

In some other instances, the Q factor is determined by calculating a bandwidth given by the identified crossing point and a second crossing point having the same frequency distance from the at least one detected peak as the identified crossing point. In yet another instance, the Q factor is derived by computing the second derivative of the smoothed difference signal. The frequency coordinates or the respective pair (i.e. frequency and gain value) are identified in the smoothed difference signal around the at least one peak from this derivative. The frequency coordinates correspond to the positions, in which the second derivative changes its sign. The gain values of the two coordinates are determined from the smoothed difference signal and the Q factor is obtained in response to the two gain values.

In yet another aspect, the bandwidth is determined based on an average of the determined gained values and a second derivative function through one of the identified two points, said one of the identified two points having a local extreme in the first derivative. Alternatively, the bandwidth is determined based on half of the center gain, also referred to as gain midpoint and a second derivative function through one of the identified two points, said one of the identified two points having a local maximum in the first derivative.

Another aspect concerns a computer system having one or more processors and a memory coupled to the one or more processors. The memory comprises instructions, which when executed by the one or more processors cause the one or more processors to perform the method according to any of the preceding claims. A non-transitory computer-readable storage medium may also comprise computer-executable instructions for performing the method according to any of the preceding claims.

SHORT DESCRIPTION OF THE DRAWINGS

Further aspects and embodiments in accordance with the proposed principle will become apparent in relation to the various embodiments and examples described in detail in connection with the accompanying drawings in which FIG. 1 shows a frequency gain diagram of a cascade peaking EQ filter that can be used to suppress noise peaks in a sound signal;

DETAILED DESCRIPTION

The following embodiments and examples disclose various aspects and their combinations according to the proposed principle. The embodiments and examples are not always to scale. Likewise, different elements can be displayed enlarged or reduced in size to emphasize individual aspects. It goes without saying that the individual aspects of the embodiments and examples shown in the figures can be combined with each other without further ado, without this contradicting the principle according to the invention. Some aspects show a regular structure or form. It should be noted that in practice slight differences and deviations from the ideal form may occur without, however, contradicting the inventive idea.

Figure 4A:
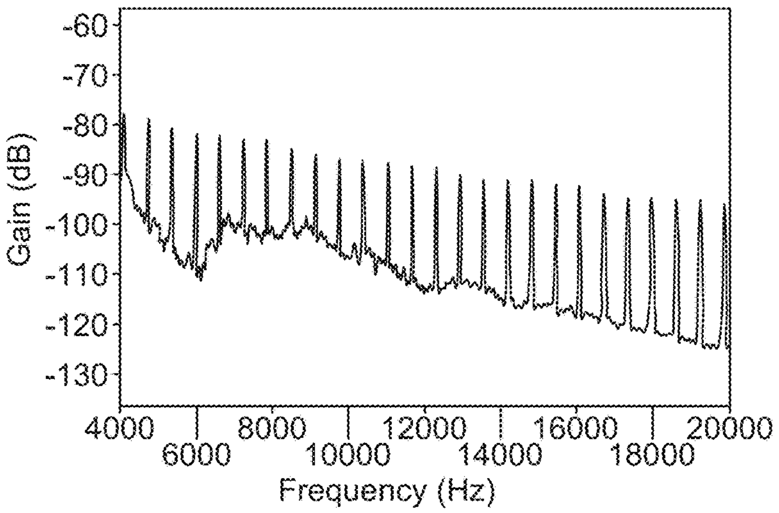
FIGS. 4A to 4C show several frequency-gain diagrams illustrating the step of obtaining a smoothed difference signal in accordance with some principles of the proposed method.
Figure 5:
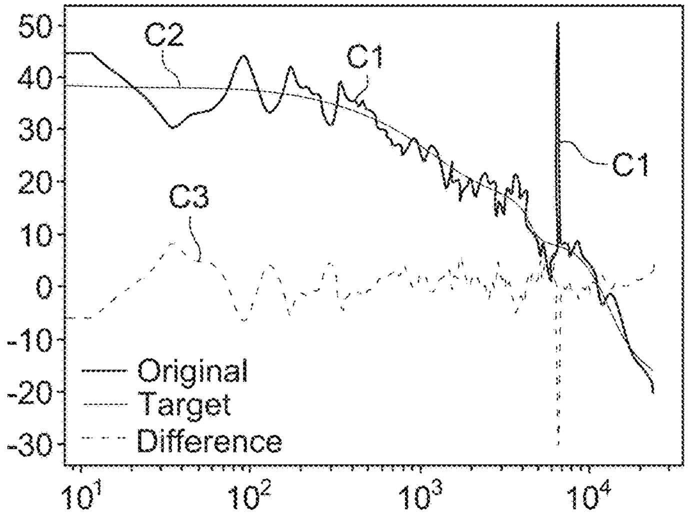
FIG. 5 illustrates a frequency-gain diagram showing the results of a smoothed difference signal in connection with a smoothed target spectrum and an actual sound signal having a peak to be suppressed.

Recorded sound signals may contain continuous or periodic noises coming from various but artificial origin. Those origins include for example electric humming from circuits, open or closed electric loops and the like. Usually, such noises are on a single frequency or rather narrow band within the audible range and not considered broad or wide band. During processing of the recorded signals, those noise peaks should be suppressed to improve the listener's experience. FIG. 4A but also FIG. 5 illustrate examples of recorded signals that includes such narrow band noise peaks in the frequency spectrum.

For the purpose of denoising, one may apply a negative peaking EQ filter onto the signal, wherein the negative peaking EQ filter contains a narrow, but highly negative gain, and therefore selectively attenuates the selected narrow region in the frequency spectrum. Several filter types can be used for this purpose. For the present examples, a second order IIR filter is utilized; however, it is to be understood that various filter types and even combinations thereof can be used to achieve the desired result, that is to suppress the spurious noise without affecting the use signal too much. The transfer function of a negative peaking EQ filter for suppressing a single peak at the center frequency $f_c$ with a sampling rate of $f_s$ and a given Q factor as well as a gain $g_{db}$ is given by $$H(z) = \frac{b_0 + b_1 z^{-1} + b_2 z^{-2}}{1 + a_1 z^{-1} + a_2 z^{-2}} \tag{1}$$

-continued with $$\omega_0 = 2\pi f_c / f_s$$

$$\alpha = \frac{\sin\omega_0}{2Q}$$

$$g = 10^{\frac{g_{db}}{40}}$$

$$b_0 = g\frac{g\alpha + 1}{\alpha + g}$$

$$b_1 = -2g\frac{\cos\omega_0}{\alpha + g}$$

$$b_2 = -g\frac{g\alpha - 1}{\alpha + g}$$

$$a_1 = -2g\frac{\cos\omega_0}{\alpha + g}$$

$$a_2 = \frac{-\alpha - g}{\alpha + g}$$

The recorded sound signal may comprise more than a single noise peak. FIG. 4A illustrates such example with a plurality of narrow band peaks that need to be removed. Consequently, one may stack a plurality of filter elements for with the transfer function as described above generate a negative peaking EQ filter also referred to as negative Peaking EQ filter cascade. The output of one filter element within the negative peaking EQ filter cascade acts as an input for the next filter element. For N of such filter elements, the overall transfer function of the negative peaking EQ filter cascade is given by:

$$H(z) = H_1(z) * H_2(z) * H_3(z) \ldots * H_N(z) \tag{2}$$

Figure 1:
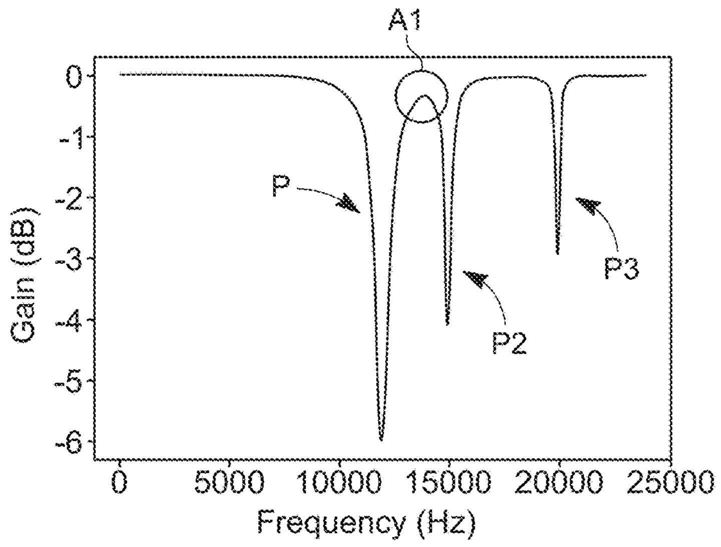

FIG. 1 shows a transfer function of a negative peaking EQ filter with three filter elements P1, P2 and P3. When applied to an audio signal, the negative peaking EQ filter suppresses the respective frequency portions by the given negative gain.

Filter element P1 comprises a center frequency at appr. 12 kHz, while filter elements P2 and P3 have their center frequencies at 15 kHz and 20 kHz, respectively. Each filter is characterized by a Q factor and a gain value, the latter being −6 dB, −4 dB and −3 dB, respectively. For the proposed negative peaking EQ filter and the method in this application, the Q factors, which are based on the bandwidth of the filter elements are adjustable to count for different possible bandwidth of the noise peaks. This is visible in the bandwidth of the negative peak in FIG. 1. Peak P1 comprises the highest Q factor with decreasing Q factors on peaks P2 and P3.

It has also been found that the Q factor as well as the gain parameters of adjacent filters will affect each other, if the peaks to be suppressed are closely spaced apart. This behavior is visible between peaks P1 and P2, respectively. The overall gain for the negative peaking filter will therefore be based on a gain interaction matrix that takes the various peaks and its bandwidth into account. The gain for each filter will be calculated based on those parameters.

Figure 2:
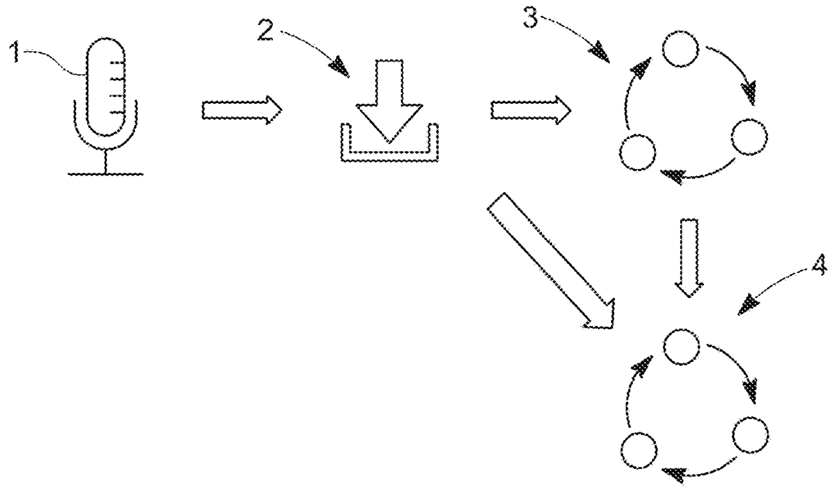
FIG. 2 illustrates a schematic view of a workflow for sound processing.

FIG. 2 illustrate the basic steps for a method of recording and processing the recorded sound. The sound is recorded via a microphone arrangement 1 and subsequently stored as a digital signal within a memory storage 2. The microphone arrangement comprises one or more microphones, recording for example speech and ambient sound, thus providing a spatial sound environment. In some aspects, the recorded sound is just speech and ambient sound, recorded for instance in stereo or even mono. The recorded sound is digitized using AD conversion and stored as a digital sound file or sound data in memory 2. The resolution of the sound file is larger than 8 bits, for example 16 bit. The sound file can actually contain the raw data (e.g., pcm with a sampling rate of 44.1 kHz, 48 kHz or also 96 kHz) as such or in a pre-defined preferably lossless format.

Figure 3A:
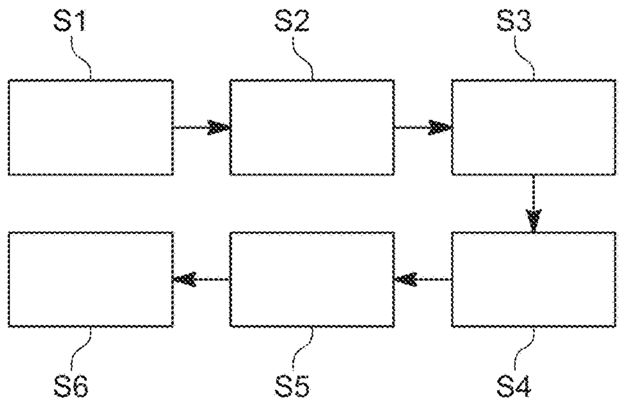
FIG. 3A shows an embodiment of a method for processing a sound signal in accordance with some aspects of the proposed principle.

After recording, the sound file is processed using processes 3 or 4. As illustrated, the sound file can be processed in parallel using processes 3 and 4, or sequentially, such that the output of process 3 is applied as input to process 4. FIG. 3A illustrates an exemplary embodiment of a method for processing an audio signal in accordance with some embodiments of the proposed principle.

The audio signal is obtained in step S1 and stored as a digital signal in the memory. A smoothed difference signal is then obtained from the stored audio signal and a smoothed spectrum thereof in step S2. Various embodiments are possible for such process and will be explained in greater detail with regards to FIGS. 4A to 4C and 5. Generally speaking, the smoothed difference signal contains all the peaks and is also referred to as target frequency response. Said frequency response has one or more negative peaks, which are to be approximated by the negative peaking filter. In other words, the method proposes to generate a negative peaking EQ filter that closely resemble the smoothed difference signal. Applied to the recorded sound signal, the so generated negative peaking EQ filter suppresses the noise in the desired way.

The smoothed difference signal is represented as a frequency-gain spectrum. In step S3, at least one peak is detected within the smoothed difference signal. A portion of the smoothed difference signal will be identified as peak, if it exceeds a certain threshold. The threshold is adjustable and may be set in dependence on the frequency at which the peaks occur. Such approach can ensure that noise peaks in frequency bands of interest, that is the frequency range for which the ear is most sensible, are more suppressed than those in other peaks. For example, since this method is employed to correct speech, peaks found in frequencies below 300 Hz are substantially ignored. This way the risk of accidentally suppressing the fundamental frequency of the speaker is reduced. The position and "strength" or volume of the detected peaks are stored in memory.

In a subsequent step S4, a negative peaking filter response is determined based on the above detected peaks. More particularly, the negative peaking filter response to be calculated is defined as one or more filter element, each filter element centered around one or more of the detected peaks. Each filter element is given by a Q factor and a gain parameter, which in turned are determined from the respective detected peaks of the smoothed difference signal. Due to the above-mentioned possible interaction between adjacent filter elements, one may calculate the gain parameter and Q factor based on this behavior.

The gain parameter as calculated in step S5 is derived from a gain interaction matrix with elements based on magnitude responses at cut-off frequencies around the at least one detected peak. The gain interaction matrix is used to adjust for the interactions between each filter element in the negative peaking EQ filter. If there is only a single filter element, that is the target spectrum and the cascade consisted of a single negative peaking EQ filter, the desired gain would simply be the value of the magnitude spectrum at its peak. The same approach can be applied if the filter elements are spaced far apart from each other, without interaction between the elements.

However, this is rarely the case. Usually, one needs to estimate a series of filter elements, closely spaced, where each filter element of the negative peaking EQ filter interacts with the others in a non-linear fashion. An adjustment for the interactions between each filter element in the cascade is required to calculate the gains for each of those filter elements within the negative peaking EQ filter. For this reason, an interaction matrix $M_I$ is constructed that reads:

$$M_I = \begin{bmatrix} |H_1(e^{j\omega_1})| & |H_1(e^{j\omega_2})| & \dots & |H_1(e^{j\omega_M})| \\ |H_2(e^{j\omega_1})| & |H_2(e^{j\omega_2})| & \dots & |H_2(e^{j\omega_M})| \\ \dots & & \ddots & \vdots \\ |H_N(e^{j\omega_1})| & |H_N(e^{j\omega_2})| & \dots & |H_N(e^{j\omega_M})| \end{bmatrix} \quad (3)$$

A matrix element $H_n(e^{j\omega_m})$ corresponds to the magnitude response of the n-th filter element at the m-th point, were it is to be placed alone in the cascade. The above-mentioned m points are associated with the cut-off frequencies of each of the N filter element, as well as their geometric means $$f_{c,m} = \sqrt{f_{c,m-1} f_{c,m}}$$

The filter elements of the negative peaking EQ filter used to compute the interaction matrix are characterised by the Q factor, whose calculation is explained with respect to FIGS. 7A to 7F in more detail.

A prototype gain of $g_{db}$=17 db is used as an initial starting point for each filter element. It is found that this is a good starting point for the calculation. Then, the individual gains for the filter elements are calculated and stacked in a vector using the following iterative equation:

$$g_{db}^{(i+1)} = M_I^{(i),t} t \quad (4)$$

Element t of equation (4) corresponds to the values of the target spectrum at the m points, $$M_I^{(i),t}$$

is the Moore-Penrose pseudoinverse of M at the i-th step of the iteration, defined as:

$$M_I^t = (M_I^T M_I)^{-1} M_I^T \quad (5)$$

and $M_I$ is the interaction matrix computed from equation (3) but calculated with filter gains at the i-th step:

$$g_{db}^{(i)}.$$

Equation (4) converges in very few iterations (1 or 2 are usually sufficient).

Apart from the gain factor, the Q factor is also calculated for each filter element using an approach explained in FIGS. 7A to 7F. The Q factor is geometrically obtained based on determined cut-off frequencies around the at least one detected peak. The generated negative peaking EQ filter is then applied to the obtained sound signal.

Figure 3B:
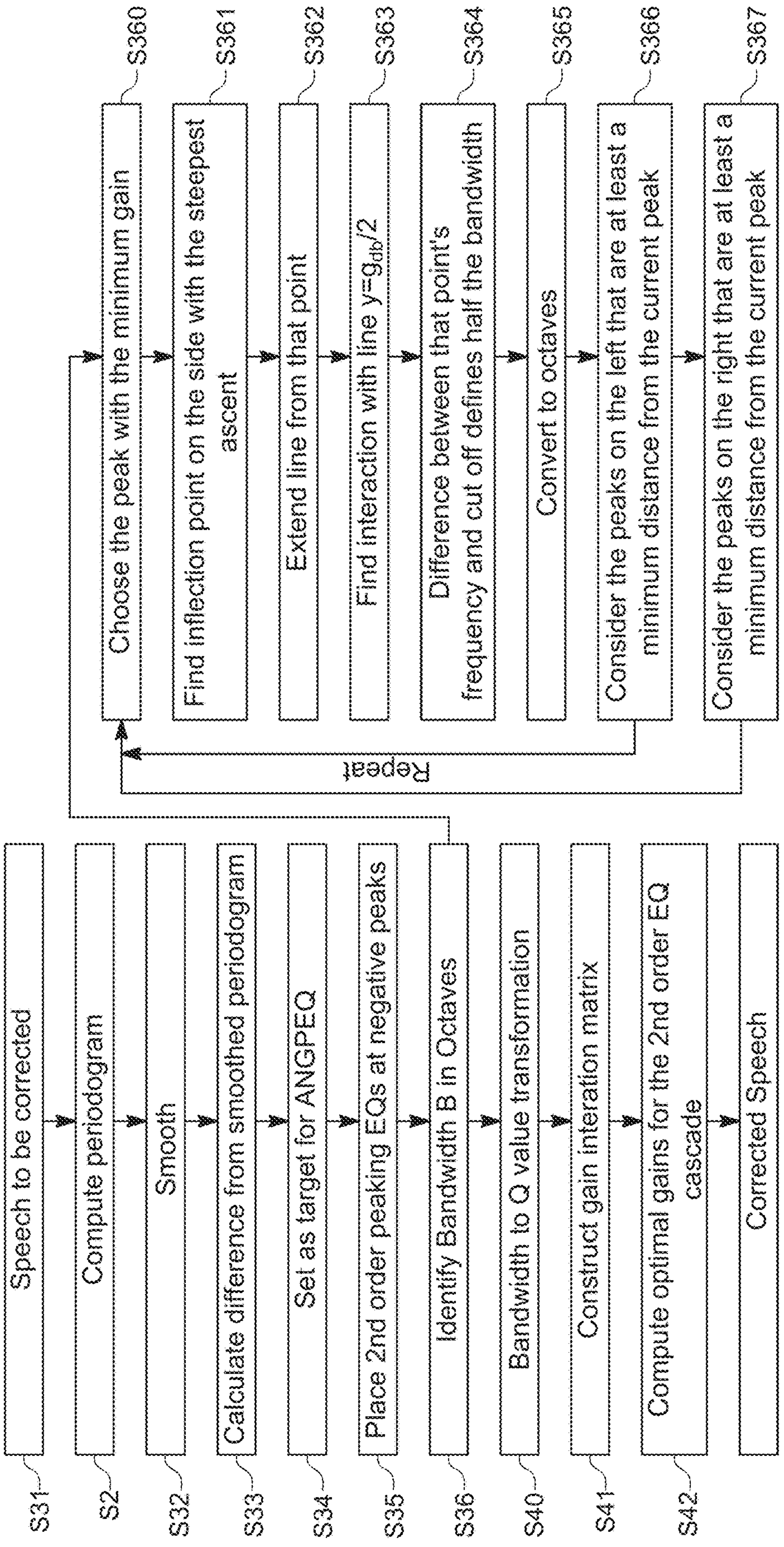
FIG. 3B illustrate another embodiment of a method for processing a sound signal in accordance with some aspects of the proposed principle.

FIG. 3B illustrates another embodiment of a method for processing a sound signal in accordance with some aspects of the proposed principle. The speech to be corrected is transformed into a spectrum by computing its periodogram in step S2. This step is similar as in the previous example, however a periodogram is a different approach for generating a frequency-gain spectrum. The computed periodogram is smoothed in step S32 to achieve a smoothed spectrum. Then, the smoothed spectrum and the calculated periodogram are used to derive the smoothed difference signal. The result, similar to the embodiment of FIG. 3A, is set in step S35 as a target response for the subsequent process ANG-PEQ to derive the negative peaking EQ filter from it.

If there is only a single peak detected, the process is relatively simple; however with more than a single peak, the following steps are repeated until filter parameters Q and gain are determined for all identified peaks. For this process, the step S36, namely identifying the bandwidth for each filter element is branched into steps S360 to S367. Those steps are repeated.

In step S360, the largest negative peak is selected as the first peak for which the filter parameters are to be determined. The expression "minimum gain" corresponds thereby to the "most negative" peak in the target response. Once the initial peak is selected, the process continues by identifying the inflection point on the side with the steepest curve. The inflection point x is thereby defined as f"(x)=0 where f"(x) is the second derivative of the target response. Likewise, the steepest ascent corresponds to the extreme (and more precisely), the minimum of the first derivative of the target response function. In other words, one starts at the peak and identifies the position in frequency and gain, for which the second derivative becomes zero, while the first derivative has its extreme value (basically, there are two points for which the second derivative becomes zero, namely one on the left side and one on the right side, and the one with a lower value for the first derivative is chosen.

In step S362, a virtual line is extended from the identified point of step S361 in a linear fashion. Particularly, the tangent on the identified point is derived. The tangent will virtually intersect with a constant corresponding to $g_{db}/2$ at an intersection point ip, wherein the $g_{db}$ is the target gain value. The determined intersection point ip corresponds to half of the bandwidth for the filter element centered around the peak as pointed in S364. The bandwidth is expressed in octaves and stored in a memory in step S265.

The above steps S361 to S365 are then repeated by first considering the next peak towards lower frequencies of the target response spectrum that are distanced by a specified distance from the current peak. This newly identified peak is set as new current peak and the steps repeated. If all peaks towards lower frequencies have been processed, the procedure is again repeated in step S367, this time with all identified peaks towards higher frequencies. Of course, the direction (first towards lower frequencies, then towards higher frequencies can be changed).

Figure 8:
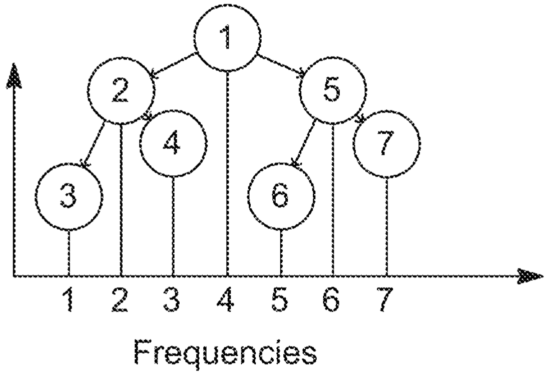
FIG. 8 is an illustration of a possible search tree for negative peak, which shows some aspects of the proposed principle.

FIG. 8 in this regard illustrates an example of such search and identification processed performed in steps S361 to S365. As one can see, the first route will be towards lower frequencies, until the lowest peak (number 3) is identified. Then the process will follow with peak 4, which is the next highest on the lower frequency side. When all peaks are identified, the process continues with peaks at the higher frequency, but again, will search for peak on the lower side first before moving to the next higher one. For the example given in FIG. 8, the order of examining peaks will be: 4→2→1→3→6→5→7 for peaks at [1 2 3 4 5 6 7].

When the final bandwidth has been calculated, the process continues by transforming the obtained bandwidth for the respective filter element into corresponding Q factors, using for instance the above-mentioned equations in step S40. The gain interaction matrix is constructed in step S41 from the respective cut-off frequencies as in the previous example. Finally, the respective gains for each of the individual filter elements are calculated based on the gain interaction matrix and the type of filter in steps S42. The Q factor and the gain parameter for each filter element is combined to generate a full peaking filter for the audio signal. The generated filter is then applied to the sound signal to suppress the noise peaks.

Figure 4B:
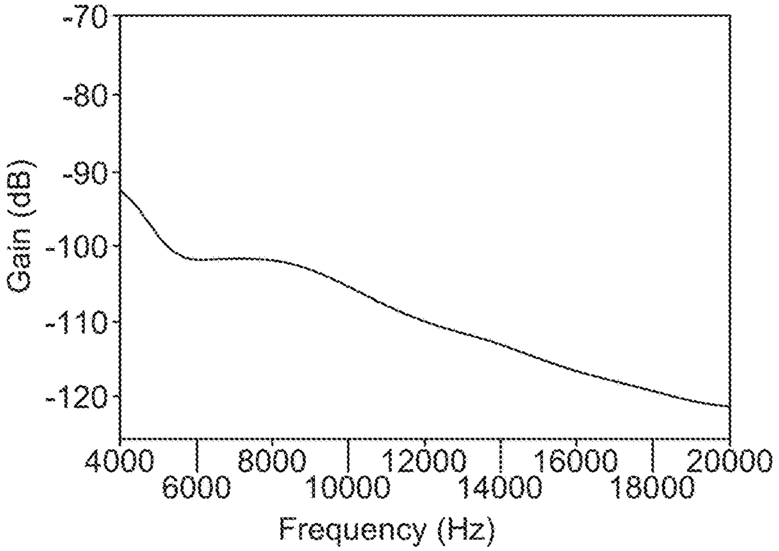
Figure 4C:
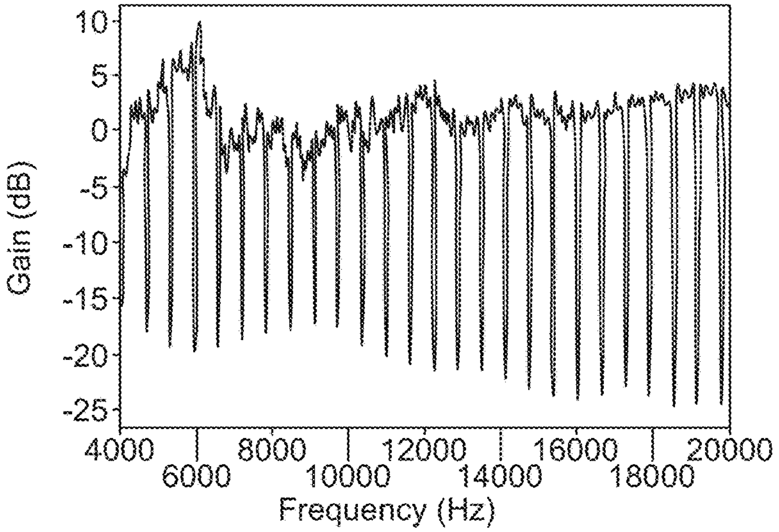

FIGS. 4A to 4C illustrate the principle or generating a smoothed difference signal, also referred to as target spectrum from the stored original sound signal. An example of a spectrum of an original sound signal is given in FIG. 4A. The sound signal comprises a plurality of peaks at regular intervals, which may arise from recording, storage, initial pre-processing. The peaks range from about 4 kHz to or approximately 20 kHz and are therefore in the audible range. Their respective values are 10 dB to 30 dB above the remaining sound. These peaks are to be suppressed.

FIG. 4B illustrates the results of the smoothing if the audio spectrum of FIG. 4A. The smoothed spectrum of FIG. 4B is derived using the following equations:

$$s[n] \leftarrow s[n-1] + \mu[n](s[n] - s[n-1]) \tag{6}$$

$$s[n] \leftarrow s[n+1] + \mu[n](s[n] - s[n+1]) \tag{7}$$

$$\mu[n] = 1 - \exp\left\{\frac{\Delta f}{0.108(n\Delta f + 24.7)}\right\} \tag{8}$$

where Δf is the bandwidth of a single spectrum bin, and the two smoothing functions starting from equation (6) are applied one after the other.

FIG. 4C then shows the result of the next step. The difference between the audio spectrum of FIG. 4A and the smoothed spectrum of FIG. 4B is calculated. This will result in the target response, with the peaks now having a negative gain, approximately around-20 db. The peaking filter is generated therefrom.

Figure 6A:
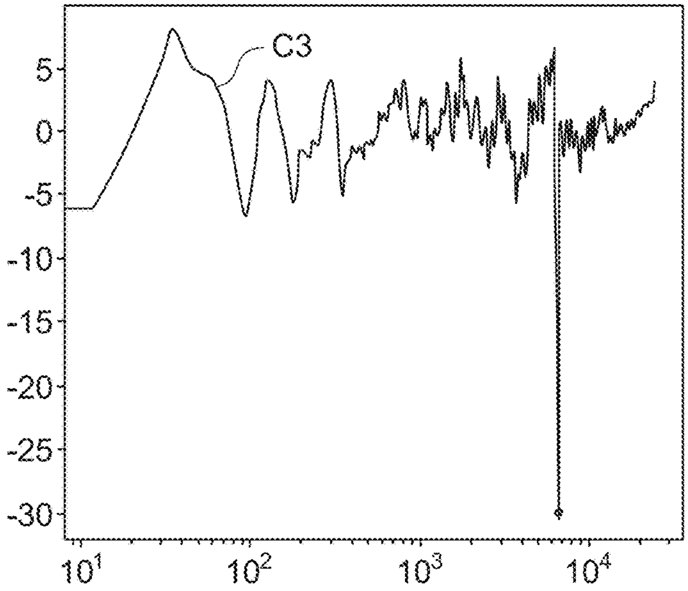
FIGS. 6A and 6B illustrate an example of a smoothed difference signals having a peak as well as the peaking filter obtained from the smoothed difference signal in accordance with some aspects of the proposed principle.

FIG. 5 illustrates another example of a spectrum of an audio signal C1 with a single peak at around 6.5 kHz. As it can be seen from the curve, the overall gain is decreasing with higher frequencies, which is a result of the recorded signal (i.e recorded speech has its main energy at lower frequencies, with only a small energy portion being generated at higher frequencies above 1.5 kHz). Curve C2 is the smoothed spectrum of C1 with a steady decease until about 6 kHz, at which there is a plateau and a small rise coming mainly from the peak in curve C1. The resulting target response signal is given by curve C3. The target response is also shown in FIG. 6A in greater detail. The negative peak with its center frequency at 6.5 kHz comprises a negative gain of about-30 db.

Figure 6B:
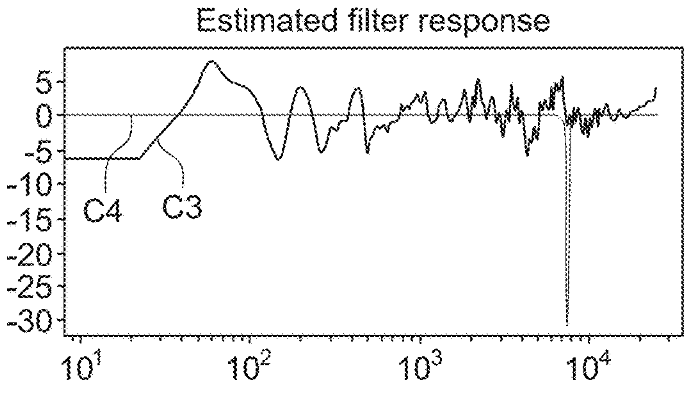

In accordance with the proposed method, the target response is now to be matched by a negative peaking EQ filter having the same or almost the same response with a negative peak at 6.5 kHz. The proposed approach disclosed herein generates such response, with the result being presented in FIG. 6B. It shows the target response C3 with the filter response curve C4 being overlaid. The filter response comprises a very high Q factor to suppress the noise at the center frequency but leaves other portions and adjacent portions of the noise peak substantially unaffected.

The estimation or determination of the Q factor for each filter element within the negative peaking EQ filter is an important aspect to obtain a filter that surgically suppresses the noise peaks, but leaves other portions of the signal unharmed. The Q factor should not be too large to avoid affecting adjacent filters or suppress useful portions of the signal but also not too low to ensure sufficient suppression. It has been found that the Q factor comprises values that can vary a lot (Q values in the range from 10 to 100 have been found useful). The flexible and adjustable determination of the Q factor is based on a geometric approach. FIGS. 7A to 7G illustrate an exemplary embodiment for such approach. It is to be understood for this embodiment, that the individual steps are visualized to outline the principle. The proposed method as such will nonetheless implemented in software executed on a computer.

Figure 7A:
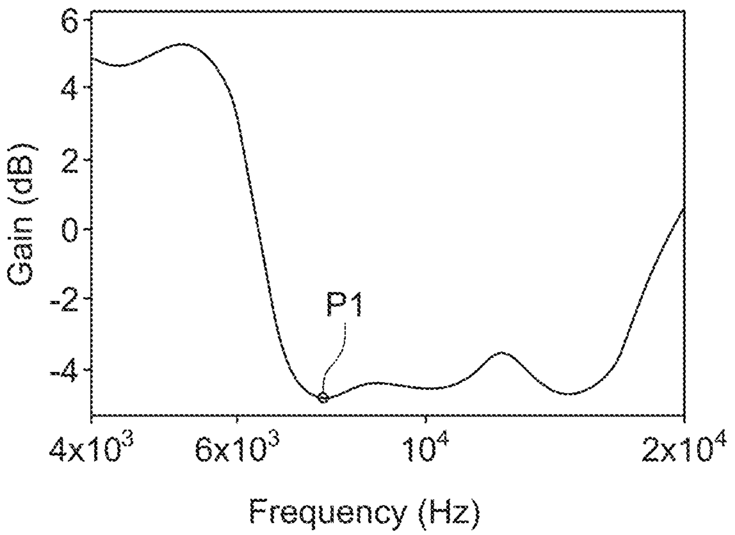
FIG. 7A illustrates a frequency-gain diagram of a smoothed target response with the position of a peak to be suppressed in accordance with some aspects of the proposed principle.
Figure 7B:
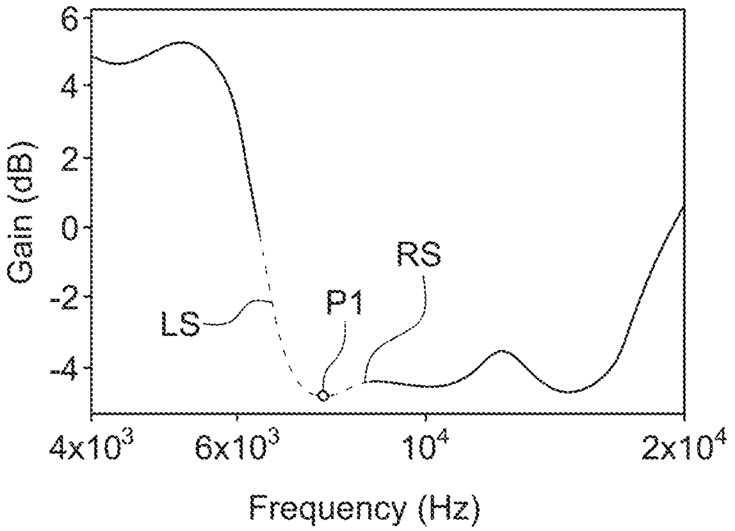
FIG. 7B shows the next step illustrating the "left" and "right" frequency side of the smoothed target response.

FIG. 7A shows a target response curve, and more precisely the smoothed spectrum of it (as stated above) for simplicity purposes and better visualization. The method is used for the difference signal itself and not necessarily for the smoothed version, although it may be possible to utilize the smoothed spectrum instead for some peak occurrences. There is a detected peak at position P1 around 7.5 kHz that is to be suppressed with a negative peaking EQ filter. In order to find the value of the Q factor one makes use of the following relation between the filter's Q value and its bandwidth B (defined as the frequency range between the two points where the peaking center takes values gdb/2 (also called midpoints):

$$\frac{1}{Q} = 2\sinh\left(\frac{\log 2}{2} B \frac{\omega_0}{\sin\omega_0}\right) \tag{9}$$

The term B is the bandwidth given in octaves and can be expressed by $$B = \frac{\log(f_r - f_l)}{\log 2} \tag{10}$$

wherein $f_l$ and $f_r$ are the midpoints at the left and right of the peak frequency respectively. This means that if we are able to specify the frequencies that the midpoints of the filter element of the peaking EQ filter should lie (and therefore its bandwidth B) the Q factor can be determined with the above equation. However as stated previously adjacent peaking filters (or other filters) would affect the magnitude response. Still, the following behaviour can be observed:

If there is another filter element of the peaking EQ filter close by, the additional filter would "pull" the magnitude response of the first filter element down with it, making it less "steep". This behaviour can for example be observed in FIG. 1, but also in FIGS. 7A and 7B. In particular, the left side LS of the target response curve is steeper than on the right side RS.

Figure 7C:
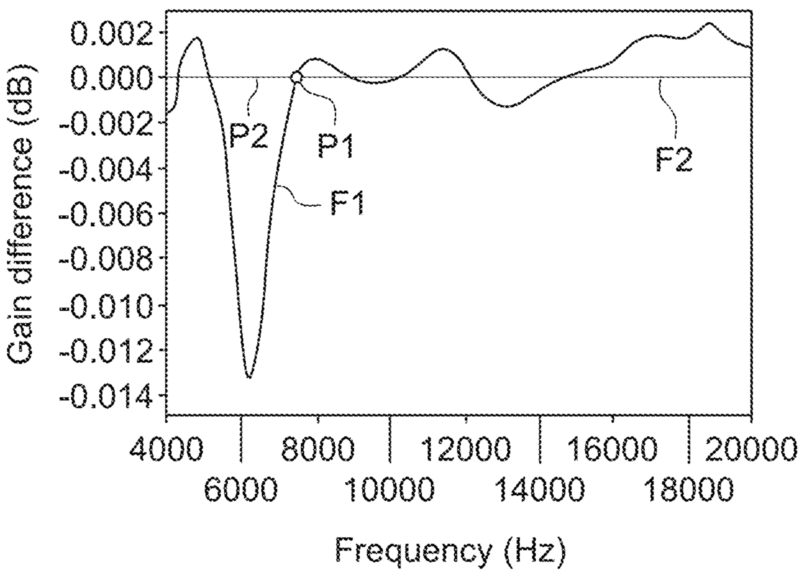
FIG. 7C is a diagram showing the first and second derivative of the smoothed target spectrum of FIG. 7A.

The proposed principle now "guesses" where the two midpoints should be and therefore define its bandwidth by first identifying the inflection point on the steepest slope. For this purpose, one should calculate the first derivative of the target response curve as well as the second derivative therefrom. These two curves are depicted in FIG. 7C.

As one can see, the first derivative F1 has its extreme value on the left side of center frequency point P1, whereas the inflection point P2 is given by the zero crossing P2-0 on said steep side. When an inflection point can be identified, it means that one of two possible outcomes:

a. There is only a single peak, or any other peak is largely spaced apart. In such case the inflection point is one of the midpoints, and by the symmetric property of the peak (note that it is symmetric) the bandwidth is given by the difference from this point to the center of the peak.
b. There is another peak nearby such that it does affect the Q factor. In that case, a prediction is required to determine where the midpoint would be and then obtain the bandwidth from said midpoint in the same way as above.

Figure 7D:
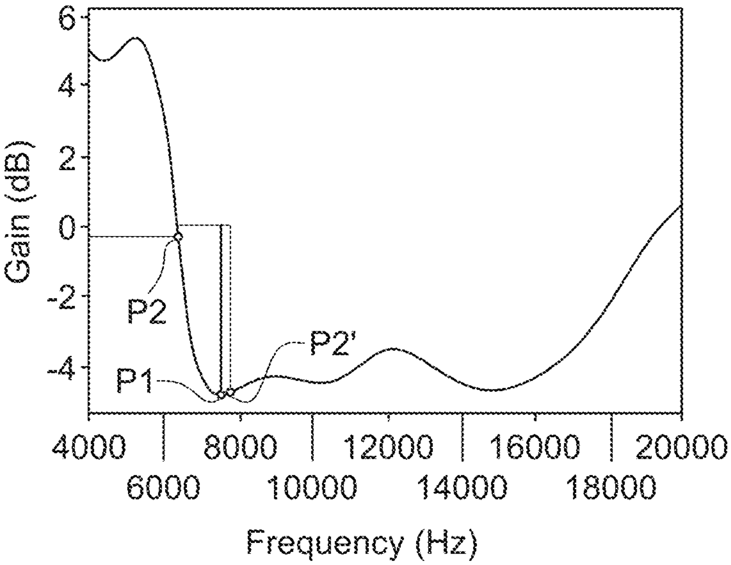
FIG. 7D shows the next step identifying the position of inflection points of the second derivative in accordance with some aspects of the proposed principle.
Figure 7E:
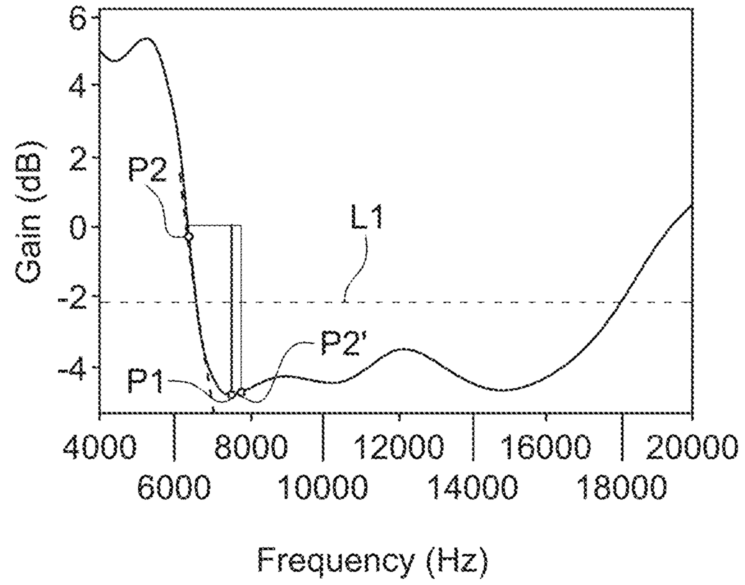
FIGS. 7E and 7F illustrate frequency-gain diagrams showing some further steps of the proposed method in accordance with some aspects.
Figure 7F:
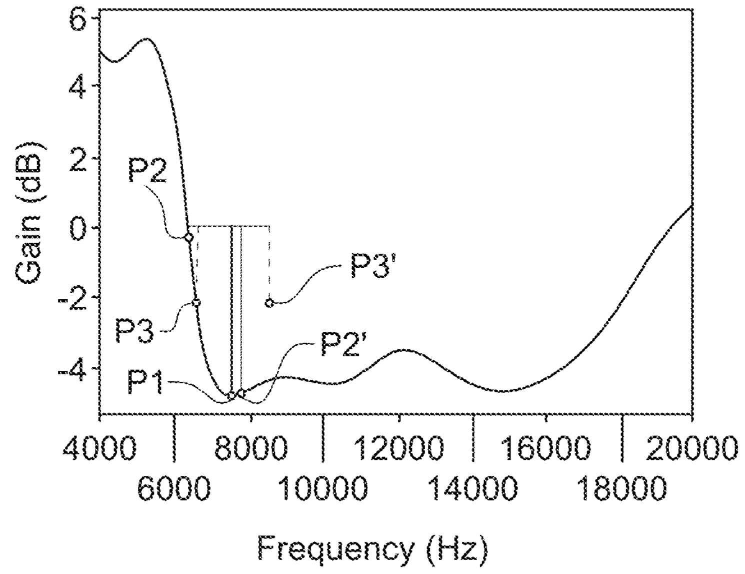

Both cases (a) and (b) can be addressed in a similar fashion depicted in FIGS. 7D to 7F. FIG. 7D shows the results of the detection of the inflection point P1 on the steepest side of the slope as well as the deflection point P2' on the right side of the center frequency point P1 towards higher frequencies. A tangent is then generated through the inflection point P2. In the digital domain, one may generate the tangent by simply calculating its function between the two sample points just left and right of the inflection point.

The midpoint is the point P3 where this line intersects the constant line at $g_{db}/2$ as shown in FIG. 7E. The line L1 at $g_{db}/2$ in this regard is given by half of the target gain, which is the gain at the center frequency point P1. Alternatively, the average of the gain values from the determined gained values at the two inflection points P3 and P3' can be used. Point P3 is the first point defining the bandwidth. For the second point it is assumed that the filter bandwidth is symmetrical around the center frequency; that is the center peak. Consequently, the second midpoint on the lower steep side of the center peak is generated by "mirroring" the midpoint P3 along the center peak. This can be done by determining the difference in frequency df=f(P1)–f(P3) and then simply adding this different to the frequency of the center peak P1. The result is point P3' as depicted in FIG. 7F.

Figure 7G:
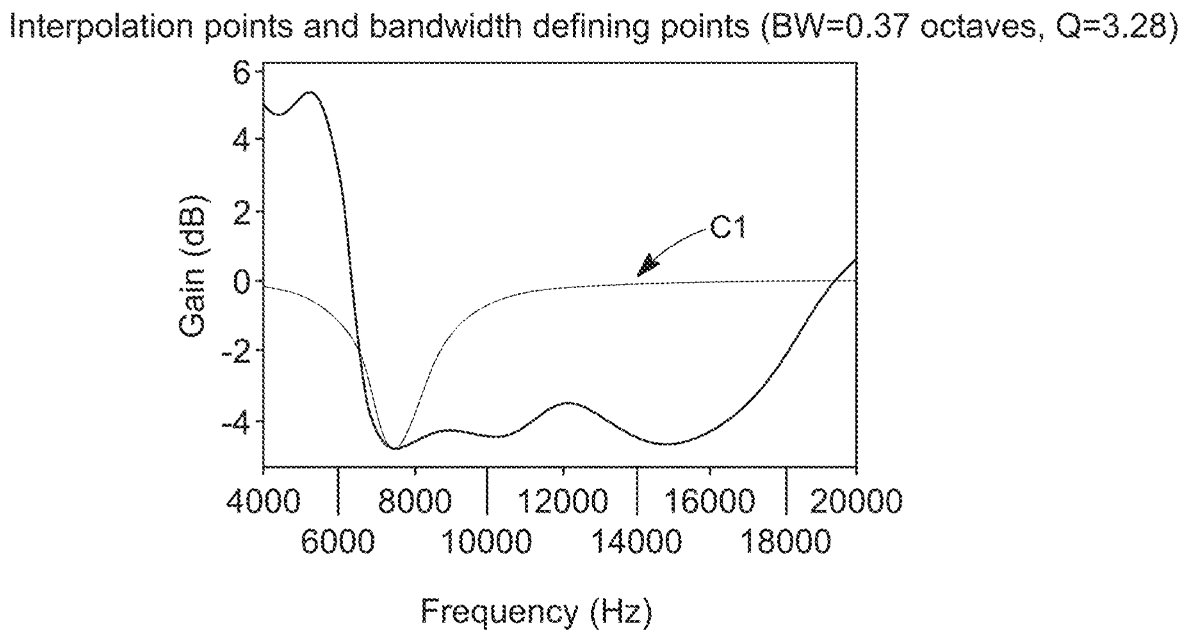
FIG. 7G shows the filter frequency response with the bandwidth defining point the resulting Q factor

The two midpoints P3 and P3' are part of the filter element response curve, that can be calculated by using the bandwidth and determining the Q factor therefrom. FIG. 7G illustrates the filter response with a Q factor of 3.28 with a bandwidth of 0.37. The bandwidth filter curve is slightly skewed to take further peaks into account that need to be suppressed by adjacent filter elements. In such case, in which further filter elements have to be determined due to additional detected peaks, it is advisable to constrain Q so that the bandwidth does not extend over a half octave between each peaking filter and the next. In this regard the overall bandwidth of each filter element is restricted to about 0.3 to 0.4 and in particular to 0.33 of an octave after the respective Q factor is determined. This will ensure the interaction is kept at low values and still provides a good suppression. The Q factor is calculated independently from the subsequent restraining of the bandwidth, because its parameters are used for the determination of the gain values.

Another aspect to be addressed is the dynamic behaviour of the detected peaks over time. Peaks may only occur periodically or also change its frequency slightly. For this reason, the filter elements of the negative peaking EQ are negatively extended to adapt to changes across time. The configuration of the filter is therefore changed as well over time. For a biquad $2^{nd}$ order IIR filter used in the examples presented herein, its time independent configuration can be written as a differential equation:

$$v[n] = x[n] - a_1 v[n-1] - a_2 v[n-2] \tag{11}$$

$$y[n] = b_0 v[n] - b_1 v[n-1] - b_2 v[n-2] \tag{11}$$

The parameters $a_k$ and $b_k$ are the same as the ones in equation (1) above. With the above-mentioned dynamic behaviour of the detected peaks over time, the parameters $a_k$ and $b_k$ are becoming time-dependent themselves and the overall configuration is also time dependent, resulting in:

$$v[n] = x[n] - a_1[n]v[n-1] - a_2[n]v[n-2] \tag{12}$$

$$y[n] = b_0[n]v[n] - b_1[n]v[n-1] - b_2[n]v[n-2] \tag{13}$$

Since the parameters $a_k$ and $b_k$ are functions of Q and $g_{db}$, it is possible to parametrize those over time. In addition, constraint on the Q factor and the gain parameter, for example such that Q cannot change more than 10% its original value and $g_{db}$ has always to be between 0 and –30. The constraints ensure that Q and $g_{db}$ do not diverge over time but stay within well-defined boundaries. To reduce the likelihood of sudden jumps of peaks in the Q factor or gain over time, one may further smooth the Q factor and the gain, resulting in:

$$Q[n] = \gamma_1 Q[n] + (1-\gamma_1)Q[n-1] \tag{14}$$

$$g_{db}[n] = \gamma_2 g_{db}[n] + (1-\gamma_2)g_{db}[n-1] \tag{15}$$

The parameters $\gamma_1$ and $\gamma_2$ comprise small values, close to 0.

The present application provides a simple but efficient way to suppress noise peaks in a recorded sound signal, particularly in a sound signal containing speech. The proposed method utilizes a geometric approach for estimating the Q factor of a filter element in a peaking filter or a peaking filter cascade, respectively. The method is flexible due to its usage of a smoothed spectrum and the determination of a target response instead of pre-recorded speech target "profiles" where they match against. This enables to process all kinds of different sound signals with varying noise peaks and levels. While the present exemplary embodiment of the proposed principle herein concerns a negative peaking EQ filter; that is a filter that is used for noise suppression, one can utilize this method also to enhance certain portions of the frequency spectrum in the same way. To this extent, the present application proposes a method for processing sound signals, in which a peaking EQ filter is determined based on a target response determined by the difference between a smoothed spectrum and the original sound signal. The gain itself can be negative for suppression the center frequencies around the filter elements of the peaking EQ filter, positive for enhancement, but also a combination thereof.

The invention claimed is:

1. A computer implemented method for processing an audio signal, comprising:

obtaining an audio signal, in particular containing speech;

obtaining a smoothed difference signal from the obtained audio signal and smoothed spectrum thereof;

detecting at least one peak in the obtained difference signal;

generating a peaking filter based on the at least one detected peak, the peaking filter comprising at least a gain parameter and a Q factor, whereas the gain parameter is derived from a gain interaction matrix with elements based on magnitude responses at cut-off frequencies around the at least one detected peak; and the Q factor is geometrically obtained based on determined cut-off frequencies around the at least one detected peak; and applying the peaking filter to the obtained sound signal and storing the processed sound signal.

2. The method of claim 1, wherein detecting at least one peak comprises detecting a plurality of peaks and wherein, a peaking filter is generated based on the detected peaks of the plurality of peaks, wherein the peaking filter comprises a cascade of filter elements and each filter element is associated with one of the plurality of the detected peaks; wherein the gain parameter of each filter element is derived from a gain interaction matrix based on magnitude responses at cut-off frequencies around each of the plurality of detected peaks; and the Q factor of each filter element is based on the geometrically obtained cut-off frequencies around the associated one of the plurality of detected peaks.

3. The method of claim 1, wherein the step of obtaining smoothed difference signal comprises:

providing a smoothed spectrum of the obtained audio signal;

evaluating a difference between the obtained audio signal and the smoothed spectrum to obtain the difference signal; and optionally smoothing the difference signal with a smoothing factor different from a smoothing factor used for providing a smoothed spectrum.

4. The method of claim 3, wherein the step of providing a smoothed spectrum comprises at least one of:

windowing the obtained audio signal having a window length;

computing and averaging over time a Short Time Fourier transform of the windowed signal; or computing a periodogram of the windowed signal, particular using Welch's Method and taking the square root therefrom;

optionally converting the computed spectrum to dB scale;

smooth the computed spectrum.

5. The method of claim 4, wherein the window length is in the range between 5 s and 30 s and in particular between 10 s and 25 s and in particular between 15 s and 20 s and in particular shorter than 22 s.

6. The method of claim 1, wherein the step of detecting at least one peak comprises:

applying a threshold to the obtained difference signal;

identifying the peak in the difference signal exceeding the threshold.

7. The method of claim 1, wherein the step of detecting at least one peak comprises:

applying a threshold to the obtained difference signal;

identifying a largest first peak exceeding the threshold;

identifying a largest second peak towards lower frequencies that is at least a minimum distance in frequency from the largest first peak, said largest first peak forming a center;

optionally repeat the previous step, with the largest second peak forming the center;

identify a largest third peak towards higher frequencies that is at least a minimum distance in frequency from the largest first peak forming a center;

optionally repeat the previous step, with the largest third peak forming the center;

wherein the step of applying a peaking filter is performed on each of the largest first, second and third peaks.

8. The method of claim 1, wherein the step of generating a peaking filter based on the at least one detected peak comprises after detecting the at least one peak:

calculating the gain parameter at the at least one peak using the gain interaction matrix based on magnitude responses at cut-off frequencies around the at least one peak;

calculate the Q factor based on the determined cut-off frequencies around the at least one detected peak and the gain thereof.

9. The method of claim 1, wherein the Q factor is based on a bandwidth given by the logarithmic value of a difference by the respective cut-off frequencies around the at least one detected peak.

10. The method of claim 1, wherein Q factor is derived by:

identifying the inflection points of the smoothed difference signal around the at least one detected peak;

computing a virtual tangent through the inflection point corresponding to the steepest slope;

identifying a crossing point between the virtual tangent and an average gain value, said average gain value derived from the gain values of the at least one detected peak; and obtaining the Q factor in response to identified crossing point.

11. The method of claim 9, wherein obtaining the Q factor comprises:

determining a bandwidth given by the identified crossing point and a second crossing point having the same frequency distance from the at least one detected peak as the identified crossing point.

12. The method of claim 1, wherein Q factor is derived by:

computing the second derivative of the smoothed difference signal;

identifying two points in the smoothed difference signal around the at least one peak whereas the second derivative changes sign;

determining a gain value from the smoothed difference signal corresponding to the at least one detected peak; and obtaining the Q factor in response to the two gain values.

13. The method according to claim 12, wherein obtaining the Q factor comprises:

determining the bandwidth based on half of the gain value and a second derivative function through one of the identified two points, said one of the identified two points having a local extreme in the first derivative.

14. A computer system comprising:

one or more processors;

a memory coupled to the one or more processors and comprising instructions, which when executed by the one or more processors causes the one or more processors to perform a method for processing an audio signal, comprising:

obtaining an audio signal, in particular containing speech;

obtaining a smoothed difference signal from the obtained audio signal and smoothed spectrum thereof; detecting at least one peak in the obtained difference signal;

generating a peaking filter based on the at least one detected peak, the peaking filter comprising at least a gain parameter and a Q factor, whereas the gain parameter is derived from a gain interaction matrix with elements based on magnitude responses at cut-off frequencies around the at least one detected peak; and the Q factor is geometrically obtained based on determined cut-off frequencies around the at least one detected peak; and applying the peaking filter to the obtained sound signal and storing the processed sound signal.

15. A non-transitory computer-readable storage medium comprising computer-executable instructions for performing a method for processing an audio signal, comprising:

obtaining an audio signal, in particular containing speech;

obtaining a smoothed difference signal from the obtained audio signal and smoothed spectrum thereof; detecting at least one peak in the obtained difference signal;

generating a peaking filter based on the at least one detected peak, the peaking filter comprising at least a gain parameter and a Q factor, whereas the gain parameter is derived from a gain interaction matrix with elements based on magnitude responses at cut-off frequencies around the at least one detected peak; and the Q factor is geometrically obtained based on determined cut-off frequencies around the at least one detected peak; and applying the peaking filter to the obtained sound signal and storing the processed sound signal.

* * * * *